United States Patent [19]

Inagaki et al.

[11] Patent Number: 5,384,705
[45] Date of Patent: Jan. 24, 1995

[54] ACTIVE SUSPENSION WITH ROLL CONTROL BY REDUCIBLY MODIFIED ESTIMATED TRANSVERSE ACCELERATION

[75] Inventors: Shoji Inagaki, Susono; Shinichi Tagawa, Anjou, both of Japan

[73] Assignees: Toyota Jidosha Kabushiki Kaisha, Toyota; Aisin Seiki Kabushiki Kaisha, Kariya, both of Japan

[21] Appl. No.: 804,754
[22] Filed: Dec. 11, 1991
[30] Foreign Application Priority Data Jan. 14, 1991 [JP] Japan ................... 3-014739

[51] Int. Cl.⁶ ............................................ B60G 17/01
[52] U.S. Cl. ................ 364/424.05; 280/707; 280/840
[58] Field of Search ............... 364/424.05; 280/6.11, 280/6.12, 707, 709, 714, 840

[56] References Cited

U.S. PATENT DOCUMENTS

| | | | |
|---|---|---|---|
| 4,621,833 | 11/1986 | Soltis | 280/707 |
| 4,706,989 | 11/1987 | Iijima et al. | 280/701 |
| 4,761,022 | 8/1988 | Ohashi et al. | 280/707 X |
| 4,803,627 | 2/1989 | Yasuike et al. | 364/424.05 |
| 4,809,176 | 2/1989 | Oowa et al. | 364/424.05 |
| 4,821,191 | 4/1989 | Ikemoto et al. | 280/707 X |
| 4,852,903 | 8/1989 | Tanaka et al. | 280/707 X |
| 4,852,906 | 8/1989 | Buma et al. | 280/707 |
| 4,856,798 | 8/1989 | Buma et al. | 280/6.11 |
| 4,869,528 | 9/1989 | Buma et al. | 280/707 |
| 4,919,444 | 4/1990 | Leiber et al. | 280/707 |
| 4,921,060 | 5/1990 | Imaseki et al. | 280/707 X |
| 4,937,748 | 6/1990 | Yonekawa et al. | 364/424.05 |
| 4,949,262 | 8/1990 | Buma et al. | 364/424.05 |
| 4,958,850 | 9/1990 | Buma et al. | 280/714 |
| 4,961,595 | 10/1990 | Fukushima et al. | 280/707 X |
| 4,971,353 | 11/1990 | Buma et al. | 280/707 |
| 4,973,080 | 11/1990 | Ikemoto et al. | 280/707 |
| 4,999,777 | 3/1991 | Schussler et al. | 364/424.05 |
| 5,013,062 | 5/1991 | Yonekawa et al. | 280/707 |
| 5,042,834 | 8/1991 | Yonekawa et al. | 280/707 |
| 5,043,893 | 8/1991 | Aburaya et al. | 364/424.05 |
| 5,046,008 | 9/1991 | Dieter | 364/424.05 |
| 5,069,475 | 12/1991 | Yonekawa et al. | 280/707 |
| 5,071,158 | 12/1991 | Yonekawa et al. | 280/707 |
| 5,103,397 | 4/1992 | Ikemoto et al. | 364/424.05 |
| 5,104,143 | 4/1992 | Yonekawa | 280/707 |
| 5,113,345 | 5/1992 | Mine et al. | 364/424.05 |

FOREIGN PATENT DOCUMENTS

| | | |
|---|---|---|
| 0306004 | 3/1989 | European Pat. Off. . |
| 0315458 | 5/1989 | European Pat. Off. . |
| 0398311 | 11/1990 | European Pat. Off. . |
| 0405492 | 1/1991 | European Pat. Off. . |
| 3619755A1 | 12/1986 | Germany . |
| 61-81212 | 4/1986 | Japan . |
| 61-193907 | 8/1986 | Japan . |
| 62-198511 | 9/1987 | Japan . |
| 62-295714 | 12/1987 | Japan . |
| 63-017185 | 1/1988 | Japan . |
| 2-3511 | 1/1990 | Japan . |
| 2-38122 | 2/1990 | Japan . |

OTHER PUBLICATIONS

Patent Abstracts of Japan, Mitsubishi Motors Corp, JP-A-63 240 418; vol. 13, No. 028 (M-788), 1989.
Patent Abstracts of Japan, Toyota Motor Corp., JP-A-63 315 313; vol. 13, No. 154 (M-814); 1989.
Patent Abstracts of Japan, Toyota Motor Corp., JP-A-02 175 404; vol. 14, No. 440 (M-1028); 1989.
Patent Abstracts of Japan, Tokico Ltd., JP-A-01 212 610; vol. 13, No. 521 (M-896); 1989.

*Primary Examiner*—Thomas G. Black
*Assistant Examiner*—Collin W. Park
*Attorney, Agent, or Firm*—Oliff & Berridge

[57] ABSTRACT

In order to prevent an inverse rolling or an unnatural rolling of a vehicle body during a turning of the vehicle on a low friction road, in an active suspension having an actuator adapted to increase or decrease vehicle height at the corresponding portion so that the rolling of the vehicle body is suppressed by a control of the actuator carried out in response to a control amount based upon an actual transverse acceleration of the vehicle body and a control amount based upon an estimated transverse acceleration deduced from a steering angle and vehicle speed, the control amount based upon the estimated transverse acceleration is reduced relative to the control amount based upon the actual transverse acceleration when a discrepancy between the estimated transverse acceleration and the actual transverse acceleration increases beyond a predetermined limit of relationship.

5 Claims, 10 Drawing Sheets

ACTIVE SUSPENSION WITH ROLL CONTROL BY REDUCIBLY MODIFIED ESTIMATED TRANSVERSE ACCELERATION

BACKGROUND OF THE INVENTION

1. Field of the Invention

The present invention relates to a suspension of a vehicle such as an automobile, and more particularly to a control of an active suspension in relation to a turning of the vehicle.

2. Description of the Prior Art

As a type of hydraulic active suspensions of vehicles such as automobiles there is known, as shown in, for example, Japanese Patent Laid-open Publication 61-81212, a hydraulic active suspension comprising an actuator provided to correspond to each vehicle wheel so as to change vehicle height at a corresponding position according to supply or exhaust of a working fluid to or from a working fluid chamber thereof, a working fluid supply and exhaust means for supplying or exhausting the working fluid to or from said working fluid chamber, a transverse acceleration detection means for detecting actual transverse acceleration of a vehicle body, a vehicle speed detection means for detecting vehicle speed, a means for obtaining steering angular velocity, and a control means for calculating a differential value of an estimated transverse acceleration of the vehicle from the vehicle speed and the steering angular velocity, so as to control said working fluid supply and exhaust means according to a control amount based upon the actual transverse acceleration and a control amount based upon the differential value of the estimated transverse acceleration.

In such an active suspension, since the working fluid supply and exhaust means is controlled according to the control amounts based upon both the actual transverse acceleration of the vehicle body and the differential value of the estimated transverse acceleration of the vehicle, the rolling of the vehicle body in a transitional state of a turning is more effectively controlled as compared with a conventional active suspension in which the working fluid supply and exhaust means is controlled according to a control amount based upon only the actual transverse acceleration of the vehicle body.

However, when a vehicle makes a turn while it is running on a road having a very low surface friction coefficient (called hereinunder "low friction road"), although the differential value of the estimated transverse acceleration changes to a relatively great extent according to changes of the steering angle by a steering operation, the actual transverse acceleration changes little, and therefore, the control amount for the rolling of the vehicle body becomes excessive with a control amount corresponding to the control amount based upon the differential value of the estimated transverse acceleration, thereby causing an inverse rolling of the vehicle body or an unnatural roll change of the vehicle body due to a discrepancy between changes of the control amount based upon the differential value of the estimated transverse acceleration and changes of the actual transverse acceleration.

SUMMARY OF THE INVENTION

In view of the above-mentioned problems in the conventional hydraulic active suspension, it is the object of the present invention to provide an improved active suspension in which not only the rolling of the vehicle body in a transitional state of a turning is effectively controlled but also an inverse rolling or an unnatural roll change of the vehicle does not occur even when the vehicle makes a turn while it is running on a low friction road.

According to the present invention, the above-mentioned object is accomplished by an active suspension comprising actuators provided to correspond to each vehicle wheel so as to change vehicle height at a corresponding position, a transverse acceleration detection means for detecting actual transverse acceleration of a vehicle body, a vehicle speed detection means for detecting vehicle speed, a steering angle detection means for detecting steering angle, and a control means for controlling said actuator in accordance with a control amount based upon the actual transverse acceleration and an estimated transverse acceleration deduced from the steering angle and the vehicle speed, wherein said control means temporarily reduces said control amount based upon the estimated transverse acceleration relative to said control amount based upon the actual transverse acceleration when a discrepancy between the estimated transverse acceleration and the actual transverse acceleration increases beyond a predetermined limit of relationship.

When the vehicle makes a turn while it is running on a low friction road, the estimated transverse acceleration deduced from a steering angle and vehicle speed changes to a relatively great extent according to a change of the steering angle by a steering operation, whereas the actual transverse acceleration changes little, and therefore, there occurs a substantial discrepancy between the estimated transverse acceleration and the actual transverse acceleration beyond a certain limit of relationship therebetween.

According to the above-mentioned construction, since the control amount based upon the estimated transverse acceleration is reduced relative to the control amount based upon the actual transverse acceleration when the discrepancy between the estimated transverse acceleration and the actual transverse acceleration increases beyond a predetermined limit of relationship, it is avoided that an inverse rolling occurs due to an excessive control amount for the roll of the vehicle body or an unnatural roll change of the vehicle body occurs due to a discrepancy between the change of the control amount based upon the estimated transverse acceleration and the actual transverse acceleration.

According to an embodiment of the present invention, said control means may be so constructed as to calculate a steering angular velocity from the steering angle, to calculate a differential value of the estimated transverse acceleration of the vehicle body from the vehicle speed and the steering angular velocity, to calculate at a determinate time interval a minimum value and a maximum value of the steering angle and a minimum value of the vehicle speed and also a minimum value and a maximum value of the actual transverse acceleration during a determinate period, to calculate an estimated transverse acceleration gap from the minimum value and the maximum value of the steering angle and the minimum value of the vehicle speed in the determinate period, and to calculate an actual transverse acceleration gap from the minimum value and the maximum value of the actual transverse acceleration in the determinate period, and to temporarily reduce said control amount based upon the estimated transverse acceleration, when a ratio of said actual transverse acceleration gap to said estimated transverse acceleration gap is less than a standard value, said control amount based upon the estimated transverse acceleration being proportional to said differential value of the estimated transverse acceleration by a multiplying factor, said control means reducing said multiplying factor to reduce said control amount based upon the estimated transverse acceleration relative to said control amount based upon the actual transverse acceleration.

In the above-mentioned embodiment, said control means may be so constructed as to calculate at a determinate time interval the minimum value and the maximum value of the actual transverse acceleration during a determinate period between N+n and N cycles preceding to a current cycle to calculate n+1 sets of values of the actual transverse acceleration gap from n+1 sets of the minimum value and the maximum value of the actual transverse acceleration, N and n each being a natural number greater than 1, and to calculate n+1 sets of values of a ratio of the actual transverse acceleration gap to the estimated transverse acceleration gap, and to reduce said multiplying factor when even one of said n+1 sets of values of said ratio is less than the standard value.

Further, in the above-mentioned embodiment, said control means may be so constructed as to return said multiplying factor to a predetermined normal value thereof when all of said n+1 sets of values of said ratio are equal to or greater than the standard value continuously for more than a predetermined number of cycles.

Or, according to a modification of the above embodiment, said control means may be so constructed as to return said multiplying factor to a predetermined normal value thereof when the estimated transverse acceleration gap is greater than a predetermined value and all of said n+1 sets of values of said ratio are equal to or greater than the standard value continuously for more than a predetermined number of cycles.

BRIEF DESCRIPTION OF THE DRAWINGS

In the accompanying drawings.

DESCRIPTION OF THE PREFERRED EMBODIMENTS

In the following the present invention will be described in more detail with respect to preferred embodiments with reference to the accompanying drawings.

Figure 1:
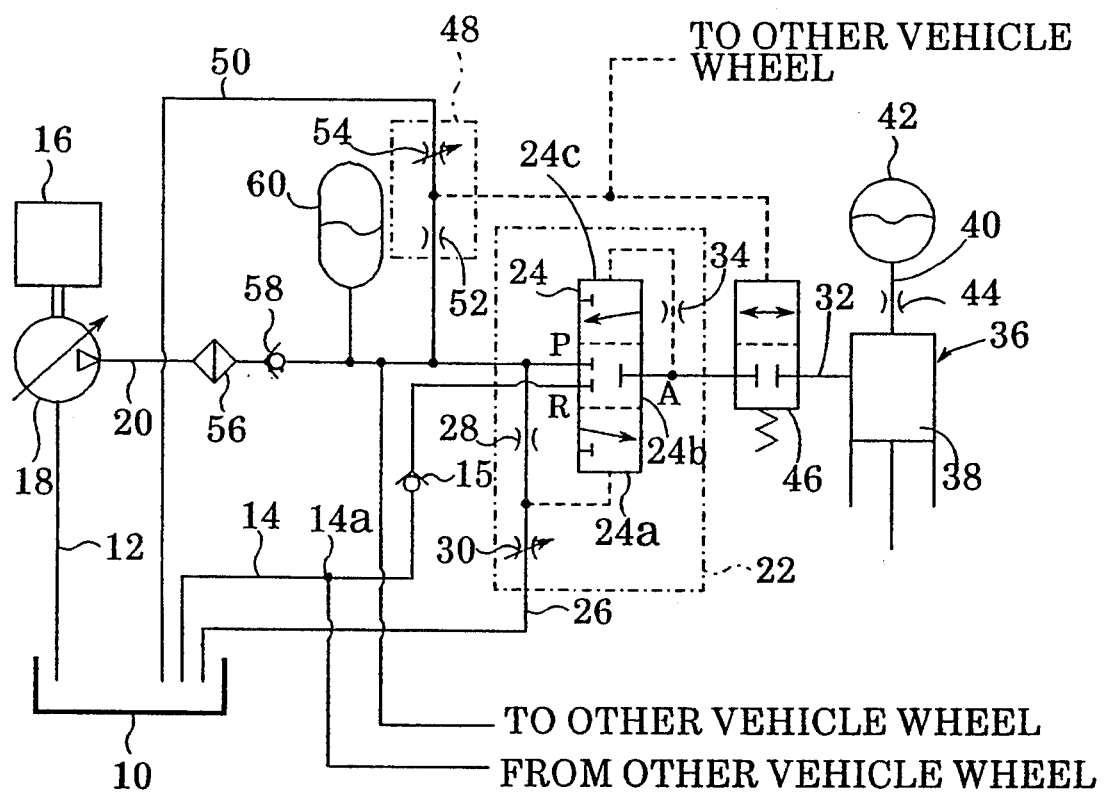
FIG. 1 is a diagram of a hydraulic circuit of an embodiment of the hydraulic active suspension according to the present invention.

In FIG. 1, 10 designates a reservoir for storing oil operating as a working fluid. A connection passage 12 is connected to the reservoir 10 at one end thereof, and a working fluid exhaust passage 14 is also connected at one end thereof to the reservoir 10. The connection passage 12 is connected at another end thereof with an intake side of a pump 18 driven by an engine 16. In the shown embodiment, the pump 18 is a variable capacity pump, a delivery slide of which is connected with one end of a working fluid supply passage 20. Another end of the working fluid supply passage 20 and another end of the working fluid exhaust passage 14 are connected to port P and port R of a pilot operated three ports three positions changeover control valve 24 of a pressure control valve 22, respectively. At a middle portion of the working fluid exhaust passage 14, on a side closer to the pressure control valve 22 than a connection point 14a with a working fluid exhaust passage from the other vehicle wheels, there is provided a non-return valve 15 which allows a flow of the working fluid only in a direction flowing from the pressure control valve 22 toward the reservoir 10.

The pressure control valve 22 includes the changeover control valve 24, a connection passage 26 connecting the working fluid supply passage 20 with the reservoir 10, and a fixed throttle means 28 and a variable throttle means 30 provided in succession at a middle portion of the connection passage 26. A connection passage 32 is connected to port A of the changeover control valve 24. The changeover control valve 24 is a spool valve adapted to be operated by pilot pressures which are pressure Pp existing in the passage 26 at a portion between the fixed throttle means 28 and the variable throttle means 30 and pressure Pa existing in a connection passage 32. The changeover control valve 24 is changed over to a changeover position 24a to connect port P with port A when pressure Pp is higher than pressure Pa, to a changeover position 24b to interrupt connection between all the ports when pressure Pp is equal to pressure Pa, and to a changeover position 24c to connect port R with port A when pressure Pp is lower than pressure Pa. The variable throttle means 30 changes its effective passage area according to a control electric current supplied to its solenoid so as to change pressure Pp in cooperation with the fixed throttle means 28.

The connection passage 32 is connected at another end thereof with a working fluid chamber 38 of an actuator 36 provided to correspond to a vehicle wheel. As is shown in the figure, the actuator 36 is a kind of cylinder-piston means disposed between a suspension member for supporting a vehicle wheel and a vehicle body, both not shown in the figure, so that it increases or decreases the vehicle height at the corresponding position according to supply or exhaust of the working fluid to or from the working fluid chamber 38. A gas-liquid spring means 42 is connected to the working fluid chamber 38 via a passage 40. A throttle means 44 is provided at a middle portion of the passage 40. The gas-liquid spring means 42 operates as a suspension spring or an auxiliary suspension spring, wherein the throttle means 44 generates a dumping force.

An on-off valve 46 is provided at a middle portion of the connection passage 32. The on-off valve 46 is constructed to be opened when a pilot pressure Pc supplied thereto from a pilot pressure control means 48 is higher than a predetermined valve opening pressure and to be closed when the pilot pressure is lower than a predetermined valve closing pressure. The pilot pressure control means 48 includes a connection passage 50 connecting the working fluid supply passage 20 and the reservoir 10, and a fixed throttle means 52 and a variable throttle means 54 provided in succession at a middle portion of the connection passage 50, wherein the pilot pressure Pc is provided as a pressure between the fixed throttle means and the variable throttle means.

A non-return valve 58 is provided at a middle portion of the working fluid supply passage 20 so as to allow the working fluid to flow only from the pump 18 toward the pressure control valve 22 through a filter 56. Further, an accumulator 60 is connected to the working fluid supply passage 20 at the downstream side of the non-return valve 58.

It is to be noted that the non-return valve 15, the pressure control valve 22, the connection passage 32, the throttle means 44, the on-off valve 46, the actuator 36, the gas-liquid spring means 42, etc. are each provided to correspond to each vehicle wheel. In this connection, in FIG. 2, the pressure control valves corresponding to front right, front left, rear right and rear left vehicle wheels are designated by 22fr, 22fl, 22rr and 22rl, respectively.

Figure 2:
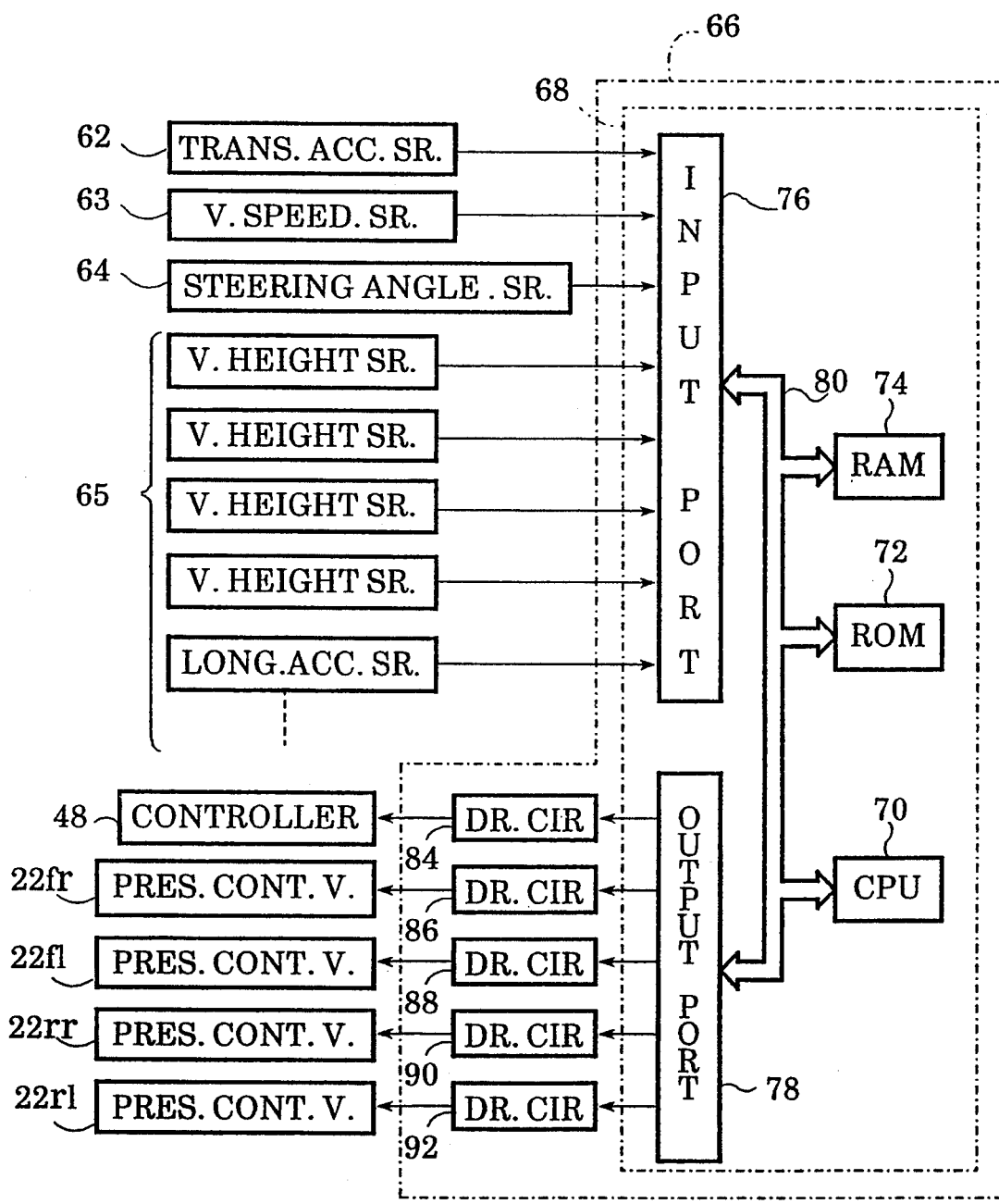
FIG. 2 is a block diagram showing an electric control means of the embodiment shown in FIG. 1.

The pressure control valve 22 is controlled by an electric control means 66 shown in FIG. 2. The electric control means 66 comprises a micro-computer 68 which may have a common construction as shown in FIG. 2, including a central processing unit (CPU) 70, a read only memory (ROM) 72, a random access memory (RAM) 74, an input port means 76, an output port means 78 and a common bus 80.

Figure 4:
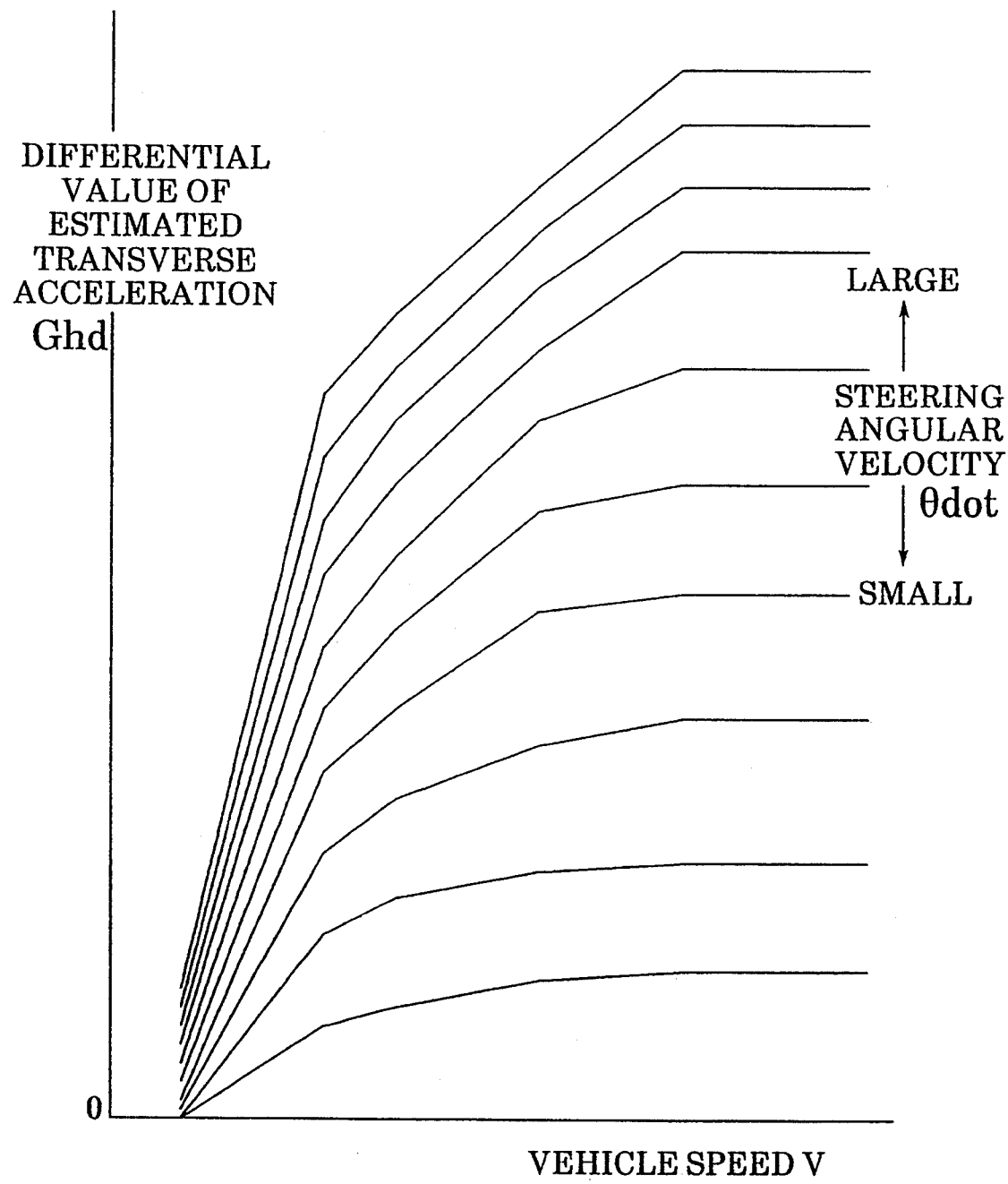
FIG. 4 is a graph showing the relationships among the vehicle speed V, the steering angular velocity $\Theta$dot and the differential value Ghd of the estimated transverse acceleration.
Figure 5:
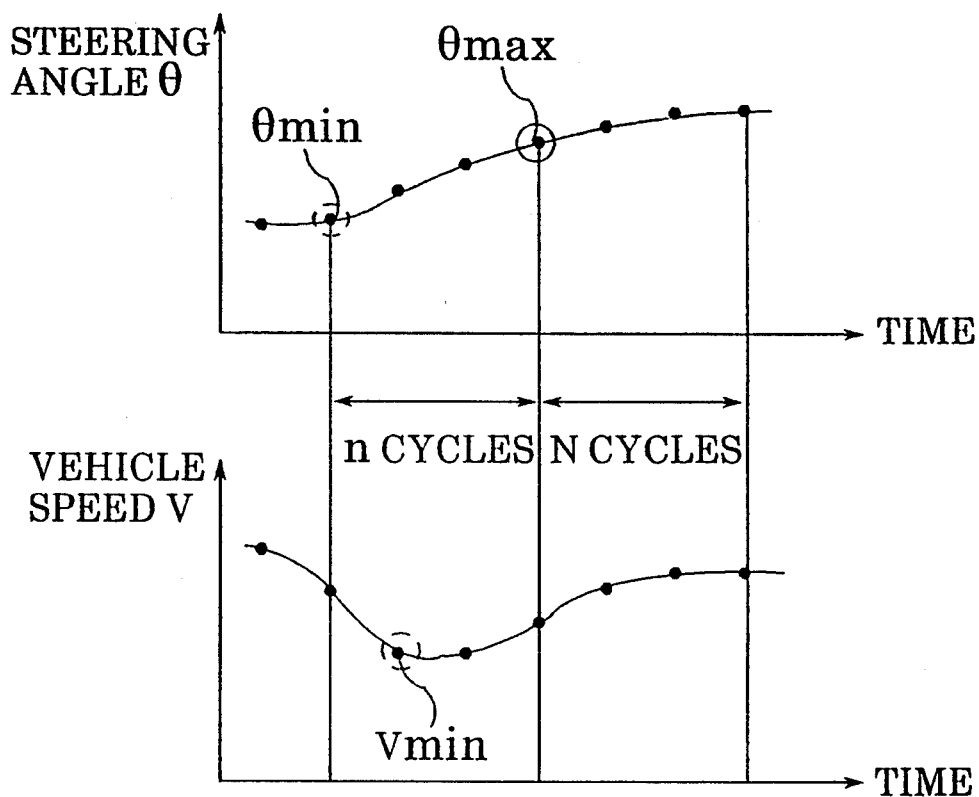
FIG. 5 is a figure showing a manner of calculating the minimum value $\Theta$min and maximum value $\Theta$max of the steering angle and the minimum value Vmin of the vehicle speed.

The input port means 76 is inputted with a signal representing transverse acceleration Gx (positive when directed leftward) of a vehicle body from a transverse acceleration sensor 62, a signal representing vehicle speed V from a vehicle speed sensor 63, a signal representing steering angle Θ (positive in right turn) from a steering angle sensor 64, add other signals concerned with the running conditions of the vehicle from sensors 65 including vehicle height sensors, a longitudinal acceleration sensor and others. The input port means 76 processes these input signals appropriately and supplies the processed signals to CPU 70 and RAM 74 according to the instructions from CPU 70 based upon a program stored in ROM 72. ROM 72 stores such a control program, maps, such as shown in FIGS. 4 and 5, and so on. CPU 70 makes various calculations and signal processing, as described hereinunder, according to the flow of signals shown in FIG. 3 to control the rolling and the pitching of the vehicle body. The output port means 78 outputs control signals toward the variable throttle means 54 of the pilot pressure control means 48 through a driving circuit 84 and to the pressure control valves 22fr, 22fl, 22rr and 22rl through driving circuits 86–92, respectively, according to the instructions from CPU 70.

The control operation of the electric control means 66 starts at a closure of an ignition switch not shown in the figure, and ends a short time after the opening of the ignition switch. When the operation of the active suspension is started, the pilot pressure control means 48 is operated to gradually increase the pilot pressure Pc, whereby the on-off valve 46 is gradually opened toward its fully opened condition. Further details of such a control, if desired, are described in the specification of Japanese Patent Application 2-199883 filed by the same applicant as the present application.

Operation of the shown embodiment will now be described with reference to the signal flowchart of FIG. 3 and the maps of FIGS. 4 and 5.

Figure 3:
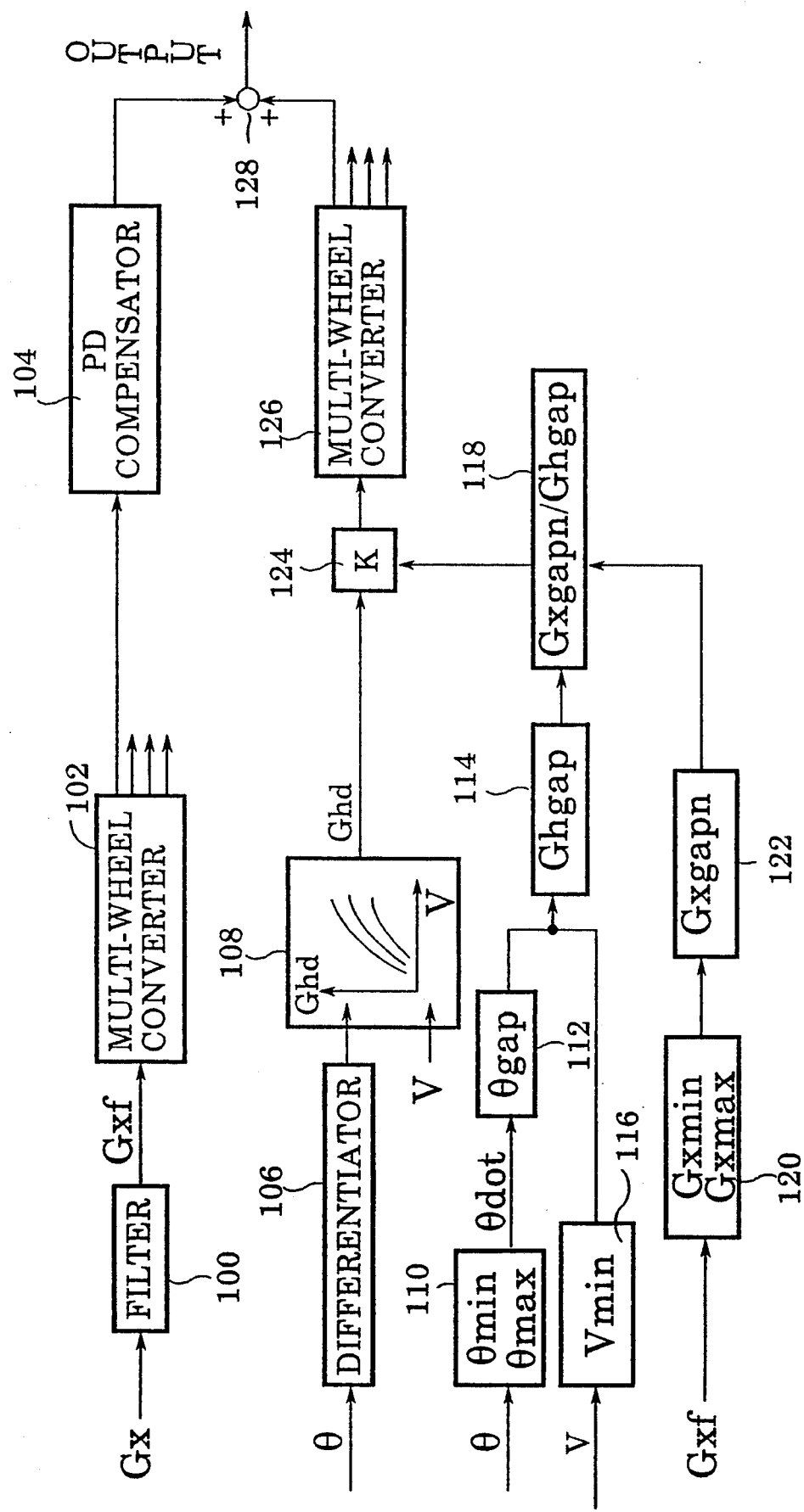
FIG. 3 is a signal flowchart showing calculations and signal processing carried out by the electric control means shown in FIG. 2.

Referring to FIG. 3, the transverse acceleration Gx detected by the transverse acceleration sensor 62 is passed through a low pass filter 100 so that high frequency components are removed therefrom, and the thus filtered transverse acceleration Gxf is converted by a multi-wheel converter 102 into transverse accelerations Gfr, Gfl, Grr and Grl for controlling actuators of front right, front left, rear right and rear left vehicle wheels. Herein the transverse accelerations Gfr, Gfl, Grr and Grl may be calculated to be Ef·Gxf, −Ef·Gxf, Er·Gxf and −Er·Gxf, wherein Ef and Er are gains for the front vehicle wheels and the rear vehicle wheels, respectively, both being positive constants satisfying Ef+Er=1. The transverse accelerations Gfr, Gfl, Grr and Grl are respectively supplied to PD compensators 104 each of which provides a PD compensation.

The steering angle Θ detected by the steering angle sensor 64 is differentiated in a differentiator 106 to generate a steering angular velocity Θdot, and based upon the steering angular velocity Θdot and the vehicle speed V detected by the vehicle speed sensor 63, according to a map shown in FIG. 4, an estimator 108 calculates a differential value Ghd of the estimated transverse acceleration of the vehicle body.

The steering angle Θ detected by the steering angle sensor 64 is also supplied to a calculator 110 which calculates a minimum value Θmin and a maximum value Θmax of the steering angle Θ in a period between N+n and N cycles preceding to the current cycle, as shown in FIG. 5, and supplies the result of calculation to a calculator 112.

Figure 7:
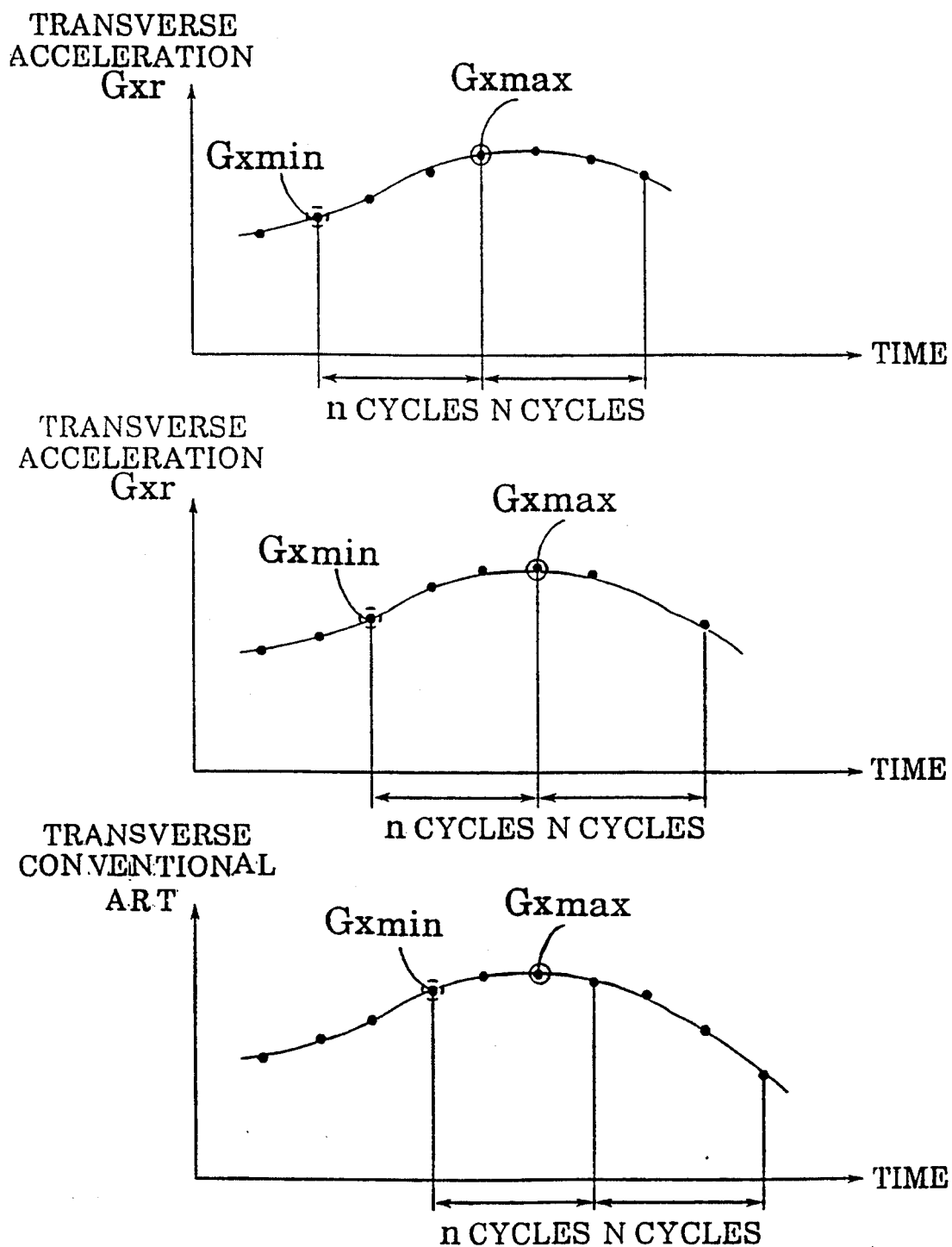
FIG. 7 is a figure showing a manner of calculating the minimum value Gxmin and the maximum value Gxmax of the actual transverse acceleration.

In FIG. 5, and also in FIG. 7 described hereinunder, N and n are both 3.

The calculator 112 calculates, based upon the signal received from the calculator 110, a steering angle gap Θgap as a difference between the maximum value and the minimum value of the steering angle Θ, and supplies the result of calculation to a calculator 114.

The vehicle speed V detected by the vehicle speed sensor 63 is supplied to a calculator 116 which calculates a minimum value Vmin of the vehicle speed V in a period between N+n and N cycles preceding to the current cycle, as shown in FIG. 5, and supplies the results of calculation to the calculator 114.

Figure 6:
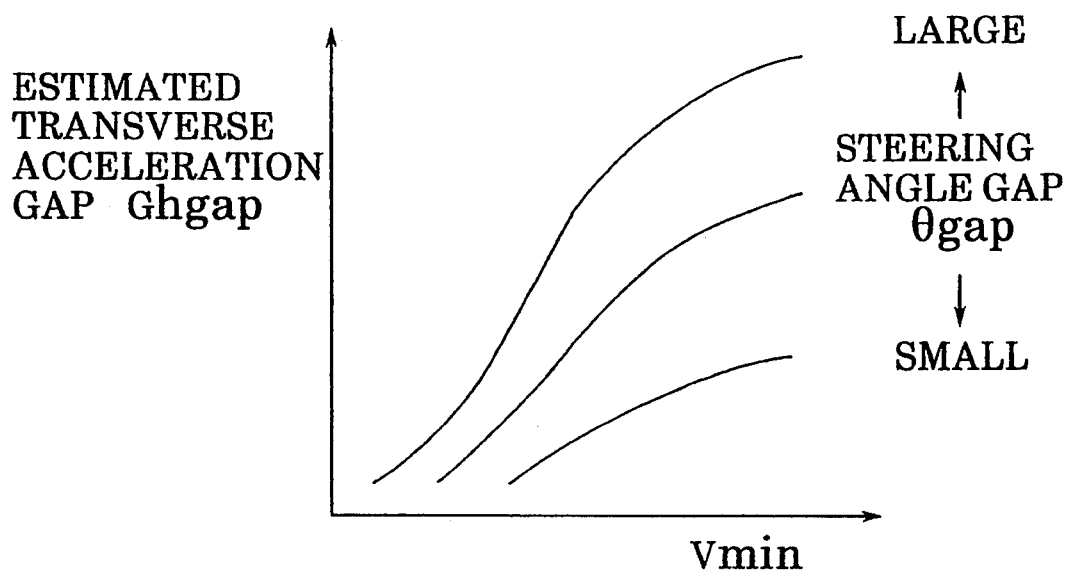
FIG. 6 is a graph showing the, relationships among the, minimum value Vmin of the vehicle speed, the steering angle gap $\Theta$gap and the estimated transverse acceleration gap Ghgap.

The calculator 114 calculates, based upon the steering angle gap Θgap supplied from the calculator 112 and the minimum value Vmin of the vehicle speed supplied from the calculator 116, and according to a map shown in FIG. 6, an estimated transverse acceleration gap Ghgap, and supplies the results of calculation to a calculator 118.

The transverse acceleration Gxf detected by the transverse acceleration sensor 62, having the high frequency components removed by the low pass filter 100, is also supplied to a calculator 120 which calculates, as shown in FIG. 7, a minimum value Gxmin and a maximum value Gxmax of the transverse acceleration in a period between N+n and N cycles preceding to the current cycle as many as n+1 times, which is the times from n=o to n=n, and supplies the results of calculation to a calculator 122.

The calculator 122 calculates, based upon the n+1 sets of Gxmin and Gxmax supplied from the calculator 120, differences Gxgapn (n=0, 1, 2, ..., n) between the respective maximum values and minimum values of the transverse acceleration, and supplies the results of calculation to a calculator 118.

The calculator 118 calculates, based upon the estimated transverse acceleration gap Ghgap supplied from the calculator 114 and the transverse acceleration gaps Gxgapn (n=0, 1, 2, ..., n) supplied from the calculator 122, a ratio Gxgapn/Ghgap to judge if the ratio is less than a standard value, and sets a gain K for the differential value Ghd of the estimated transverse acceleration to 1 when all of the n+1 values of said ratio are equal to or greater than the standard value, whereas it sets the gain K to zero if even one of the n+1 values of said ratio is less than the standard value, thereby judging the friction coefficient of the road surface as being very low, the gain K being supplied to a factor multiplier 124.

When the calculator 118 has once set the gain K to zero, it returns the gain K to 1 when it has been detected for more than No cycles that all of the n+1 values of the ratio are equal to or greater than the standard value.

The differential value Ghd of the estimated transverse acceleration of the vehicle estimated by the estimator 108 is multiplied by the gain K (1 or 0) in the factor multiplier 124, and the results of the calculation are supplied to a multi-wheel convertor 126.

The output of the factor multiplier 124 supplied to the multi-wheel convertor 126 is converted to differential values Ghdfr, Ghdfl, Ghdrr and Ghdrl of the estimated transverse acceleration for operating the actuators of the front right, front left, rear right and rear left vehicle wheel, in the same manner as in the multi-wheel converter 102.

The transverse acceleration Gpdi (i=fr, fl, rr and rl) processed for the PD compensation in the PD compensation calculator 104 and the output Ghdi (i=fr, fl, rr and rl) of the multi-wheel convertor 126 are respectively added by adders 128, and the sums Gpdi+Ghdi are provided as the feed forward control amount for the roll control to be supplied to the pressure control valves 22.

The target pressures for the working fluid chambers of the actuators and the control electric currents supplied to the solenoids of the variable throttle means for the pressure control valves 22fr, 22fl, 22rr and 22rl to accomplish the target pressures, in order to control the attitude of the vehicle body and the comfortability of the vehicle, in accordance with the running conditions of the vehicle, may be calculated based upon the feed forward control amounts Gpdi+Ghdi for the roll control, the feed forward control amount for the pitch control based upon the longitudinal acceleration, the feed forward control amount based upon the vehicle height, etc., although such active calculations do not form the gist of the present invention and may be carried out in any manner as shown in, for example, Japanese Patent Laid-open Publication 2-175405 filed by the same applicant as the present assignee, as long as the pressure control valves are controlled according to the differential values of the transverse acceleration and the estimated transverse acceleration of the vehicle body so as to decrease or prevent the rolling of the vehicle body.

Figure 8:
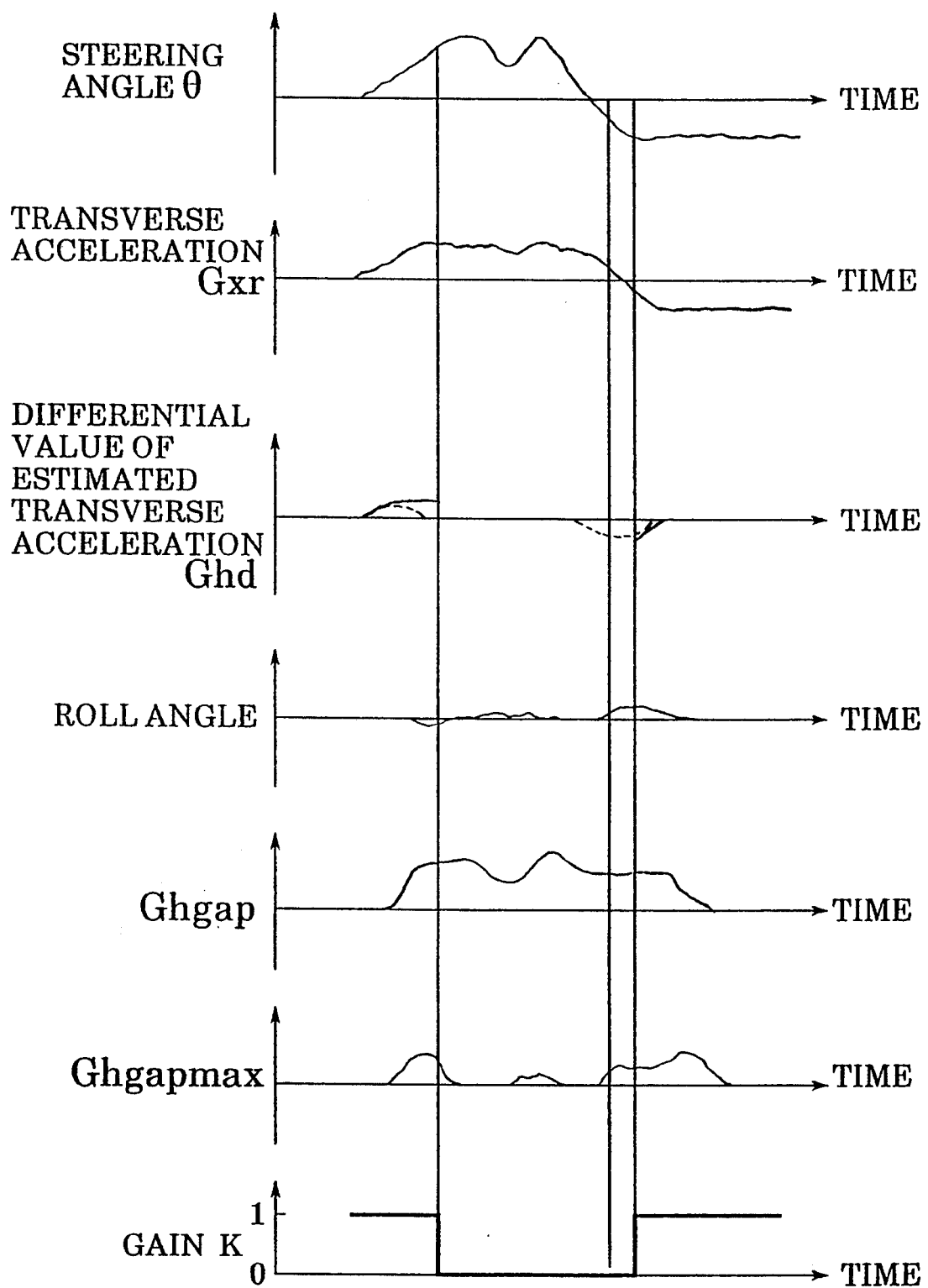
FIG. 8 is a time chart showing the operations of the embodiment.
Figure 9:
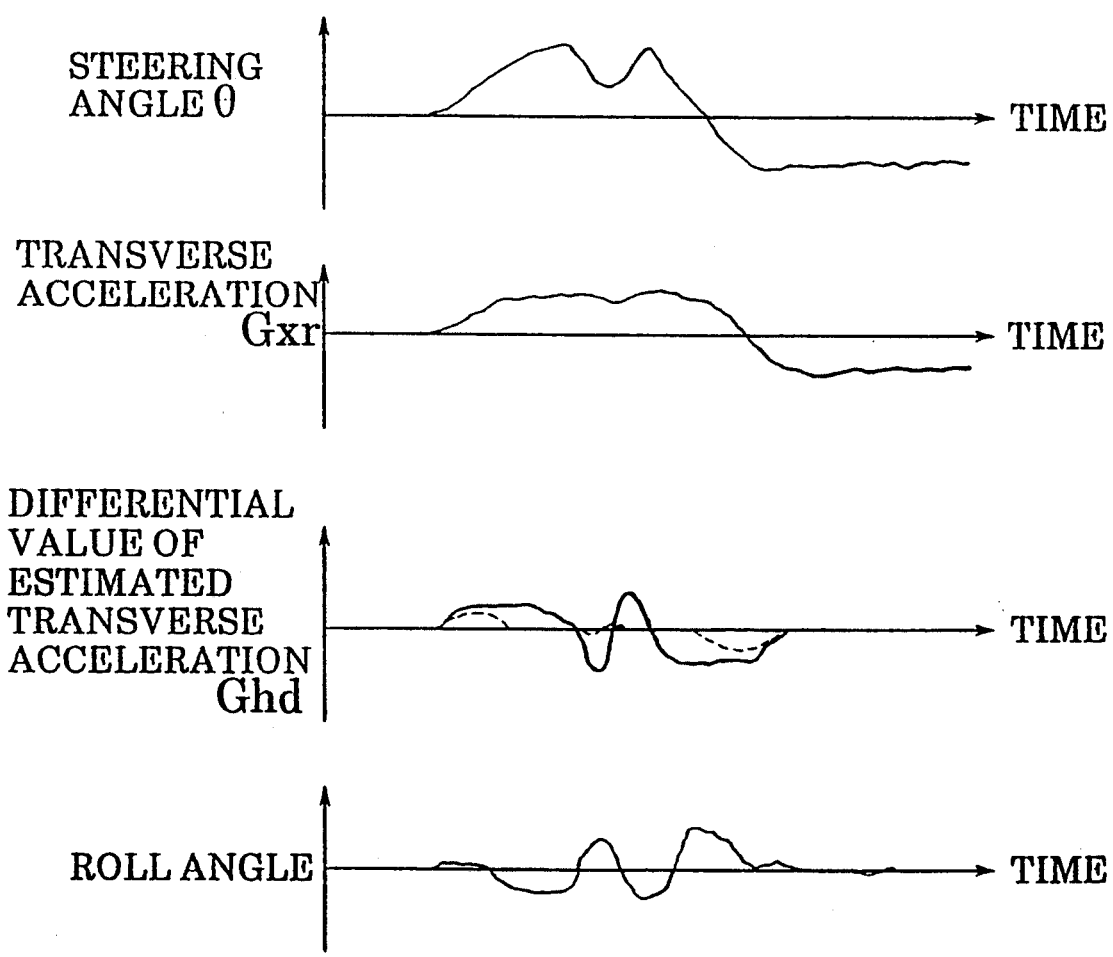
FIG. 9 is a time chart similar to FIG. 8, showing the operations of a conventional hydraulic active suspension.

FIGS. 8 and 9 are time charts showing the operation of the active suspension according to the above-described embodiment and a conventional active suspension, respectively. In these figures broken lines show the differential values of the actual transverse acceleration.

As is understood from FIG. 9, in the conventional active suspension, when the vehicle is steered when it is running on a low friction road, the differential value of the estimated transverse acceleration becomes greater than the differential value of the actual transverse acceleration, so that a relatively large difference is generated therebetween, whereby an inverse rolling of the vehicle occurs, and if the vehicle is countersteered during a turning at a limit transverse acceleration, relatively great differences in alternately changing signs occur between the differential value of the estimated transverse acceleration and the differential value of the actual transverse acceleration, thereby causing unnatural changes of the rolling of the vehicle body.

In contrast, according to the above-described embodiment, as shown in FIG. 8, when the vehicle is steered while it is running on a low friction road, the estimated transverse acceleration changes more than the actual transverse acceleration, and therefore, when even one of the n+1 values of the ratio Gxgapn/Ghgap becomes less than the standard value, the gain K is set to zero, whereby the differential value Ghdi of the estimated transverse acceleration supplied from the multi-wheel converter 126 to the adders 128 is set to zero.

Therefore, as shown in FIG. 8, when the vehicle is steered while it is running on a low friction road so that the differential value of the estimated transverse acceleration becomes greater than the differential value of the actual transverse acceleration, thereby generating a relatively large difference therebetween, the feet forward control amount based upon the differential value of the estimated transverse acceleration is set to zero. Therefore, no inverse rolling of the vehicle body occurs, and even when the vehicle is countersteered during running at a limit transverse acceleration, no unnatural change of the rolling of the vehicle body occurs.

Although in the above-described embodiment the calculator 118 returns the gain K to 1 when all of the n+1 values of the ratio are equal to or greater than the standard value continuously for more than No cycles when the gain K has once been set to zero, the calculator 118 may return the gain K1 to 1 only when the estimated transverse acceleration gap Ghgap is greater than a predetermined value and all of the n+1 values of the ratio are equal to or greater than the standard value continuously for more than No cycles.

Figure 10:
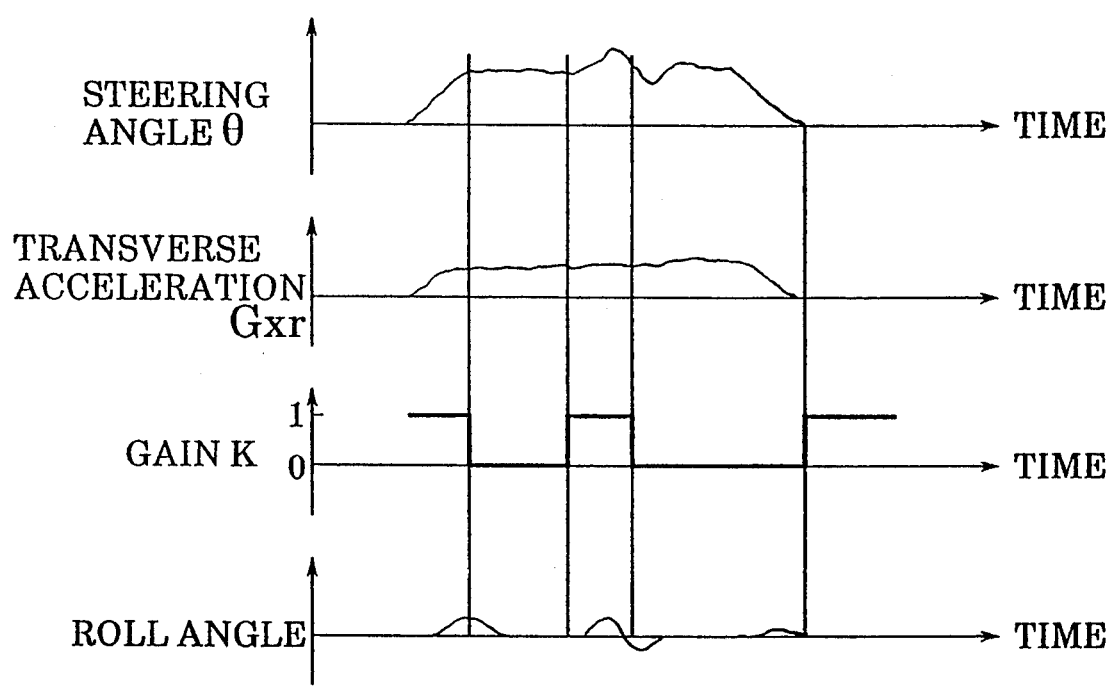
FIG. 10 is a time chart showing the operations of the embodiment in a case where the judgement of a low friction road is discontinuously made.
Figure 11:
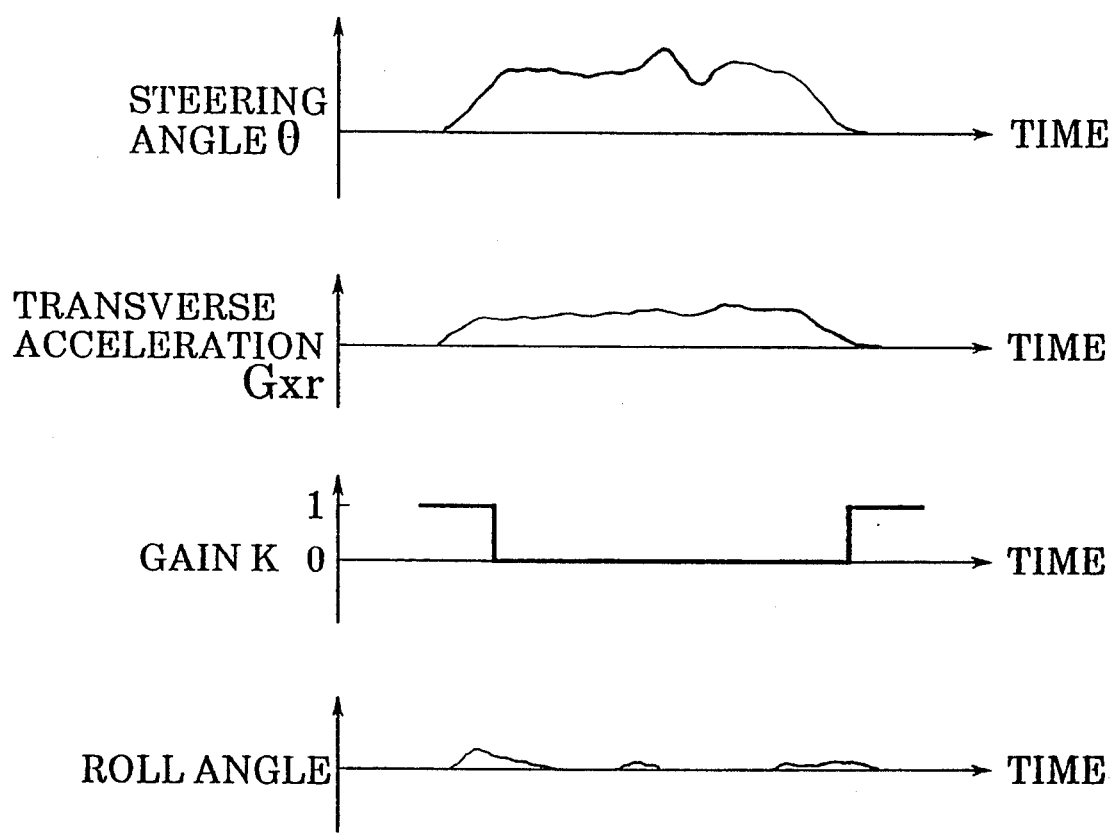
FIG. 11 is a time chart showing the operation of a modified embodiment under the same condition as in FIG. 10.

In the former measure, it can occur, as shown in FIG. 10, that an abnormal roll is generated in a period between the recovery of the gain k to 1 and a next reduction of the gain K to zero, whereas in the latter measure it is avoided, as shown in FIG. 11, that such an abnormal rolling is generated, as the reduction of the gain K to zero is maintained.

On the other hand, the temporary reduction of the gain K need not necessarily be to zero but may be to any low value as compared with its normal value which is herein described to be 1 for the convenience of description.

Although the active suspension was described as a hydraulic active suspension in the above embodiments, the active suspension may be of any other type, and further, although the means for controlling the pressure in the working fluid chambers of the actuators are pressure control valves in the above-described embodiment, such means may be flow control valves.

Although the present invention has been described in detail with respect to particular embodiments thereof, it will be apparent to those skilled in the art that various other embodiments are possible within the scope of the present invention.

Further, since the working fluid supply and exhaust means are controlled according to the control amount based upon the actual transverse acceleration of the vehicle body as well as the control amount based upon the differential value of the estimated transverse acceleration of the vehicle body when the ratio of the actual transverse acceleration gap Gxgap to the estimated transverse acceleration gap Gxhgap is equal to or greater than the standard value, the rolling of the vehicle body during a turning is effectively controlled.

We claim:

1. An active suspension, comprising:
   actuators provided to correspond to each vehicle wheel so as to change vehicle height at a corresponding position,
   transverse acceleration detection means for detecting actual transverse acceleration of a vehicle body;
   vehicle speed detection means for detecting vehicle speed;
   steering angle detection means for detecting steering angle; and
   control means for controlling each said actuator in accordance with a control amount based upon the actual transverse acceleration and an estimated transverse acceleration deduced from the steering angle and the vehicle speed, wherein said control means temporarily reduces a contribution to said control amount based upon the actual transverse acceleration when a ratio derived from the estimated transverse acceleration and the actual transverse acceleration increases beyond a predetermined value.

2. An active suspension according to claim 1, wherein said control means in a cyclic manner:
   calculates a steering angular velocity from the steering angle;
   calculates a differential value of the estimated transverse acceleration of the vehicle body from the vehicle speed and the steering angular velocity;
   calculates at each predetermined cyclic time interval a minimum value and a maximum value of the steering angle and a minimum value of the vehicle speed and also a minimum value and a maximum value of the actual transverse acceleration during a determinate period comprising a predetermined number of cycles occurring a predetermined number of cycles prior to a current cycle;
   calculates an estimated transverse acceleration gap from the minimum value and the maximum value of the steering angle and the minimum value of the vehicle speed in the determinate period; and
   calculates an actual transverse acceleration gap from the minimum value and the maximum value of the actual transverse acceleration in the determinate period, and temporarily reduces said control amount based upon the estimated transverse acceleration when a ratio of said actual transverse acceleration gap to said estimated transverse acceleration gap is less than a standard value, said control amount based upon the estimated transverse acceleration being proportional to said differential value of the estimated transverse acceleration by a multiplying factor, said control means reducing said multiplying factor to reduce the contribution to said control amount based upon the estimated transverse acceleration relative to the contribution to said control amount based upon the actual transverse acceleration.

3. The active suspension according to claim 2, wherein said control means calculates at each of the predetermined time intervals the minimum value and the maximum value of the actual transverse acceleration during the determinate period between N+n and N cycles preceding the current cycle to calculate n+1 sets of values of the actual transverse acceleration gap from n+1 sets of the minimum value and the maximum value of the actual transverse acceleration, N and n each being a natural number greater than 1, and calculates n+1 sets of values of a ratio of the actual transverse acceleration gap to the estimated transverse acceleration gap, and reduces said multiplying factor when even one of said n+1 sets of values of said ratio is less than the standard value.

4. The active suspension according to claim 3, wherein said control means returns said multiplying factor to a predetermined normal value thereof when all of said n+1 sets of values of said ratio are equal to or greater than the standard value continuously for more than a predetermined number of cycles.

5. The active suspension according to claim 3, wherein said control means returns said multiplying factor to a predetermined normal value thereof when the estimated transverse acceleration gap is greater than a predetermined value and all of said n+1 sets of values of said ratio are equal, to or greater than the standard value continuously for more than the predetermined number of cycles.

* * * * *